United States Patent
Behera

(10) Patent No.: US 12,438,866 B2
(45) Date of Patent: Oct. 7, 2025

(54) AUTOMATIC, SECURE AND BULK ONBOARDING OF DEVICES

(71) Applicant: Siemens Aktiengesellschaft, Munich (DE)

(72) Inventor: Jitendra Behera, Karnataka (IN)

(73) Assignee: Siemens Aktiengesellschaft, Munich (DE)

(*) Notice: Subject to any disclaimer, the term of this patent is extended or adjusted under 35 U.S.C. 154(b) by 231 days.

(21) Appl. No.: 18/138,770

(22) Filed: Apr. 25, 2023

(65) Prior Publication Data
US 2023/0353554 A1 Nov. 2, 2023

(30) Foreign Application Priority Data
Apr. 29, 2022 (EP) ..................................... 22170888

(51) Int. Cl.
*H04L 29/06* (2006.01)
*H04L 9/40* (2022.01)

(52) U.S. Cl.
CPC ................................ *H04L 63/0823* (2013.01)

(58) Field of Classification Search
CPC ...... H04L 63/0823; B60L 53/65; B60L 53/66; B60L 53/68; G06F 21/44; H02J 7/00045
See application file for complete search history.

(56) References Cited

U.S. PATENT DOCUMENTS

| 8,625,796 B1* | 1/2014 | Ben Ayed | H04W 12/64 |
| | | | 380/258 |
| 8,667,571 B2* | 3/2014 | Raleigh | H04W 4/18 |
| | | | 709/224 |
| 10,057,243 B1 | 8/2018 | Kumar et al. | |
| 10,124,455 B2* | 11/2018 | Ito | B25F 5/00 |
| 10,820,202 B1* | 10/2020 | Gundavelli | H04W 12/069 |
| 2011/0202192 A1 | 8/2011 | Kempton | |
| 2016/0308861 A1 | 10/2016 | Ameling et al. | |

(Continued)

FOREIGN PATENT DOCUMENTS

WO     WO 2021031061 A1     2/2021

OTHER PUBLICATIONS

Cassarino, Davide. On Board Charger algorithm design compliant with the Model Based approach. Diss. Politecnico di Torino, 2022. (Year: 2022).*

(Continued)

*Primary Examiner* — Shawnchoy Rahman
(74) *Attorney, Agent, or Firm* — Schmeiser, Olsen & Watts, LLP

(57) ABSTRACT

A method, a device onboarding system, a computer program product, and a parent charger for bulk onboarding onto a cloud-based system, devices, having at least one parent device capable of communicating with the cloud-based system and/or child device(s) connected to the parent device, are provided, and include obtaining, from the parent device onboarding parameters associated with each of the devices, dynamically obtaining device verification data, having at least a certificate associated with each of the devices, based on the onboarding parameters from a device verification system, validating the onboarding parameters based on the device verification data, and establishing a connection between the parent device and the cloud-based system for onboarding the devices, upon validation.

15 Claims, 6 Drawing Sheets

(56) References Cited

U.S. PATENT DOCUMENTS

| | | | |
|---|---|---|---|
| 2018/0307965 A1* | 10/2018 | Ogawa | G05D 1/0227 |
| 2019/0342284 A1* | 11/2019 | Vohra | H04W 12/04 |
| 2020/0044482 A1* | 2/2020 | Partovi | H02J 50/12 |
| 2020/0374700 A1 | 11/2020 | Smith et al. | |
| 2021/0058784 A1 | 2/2021 | Kedalagudde et al. | |

OTHER PUBLICATIONS

Maksuti, Silia et al., "Automated and Secure Onboarding for System of Systems", IEEE Access, vol. 9, pp. 111095-111113, DOI: 10.1109/ACCESS.2021.3102280, https://ieeexplore.ieee.org/abstract/document/9505607, Aug. 13, 2021 (Aug. 13, 2021).

* cited by examiner

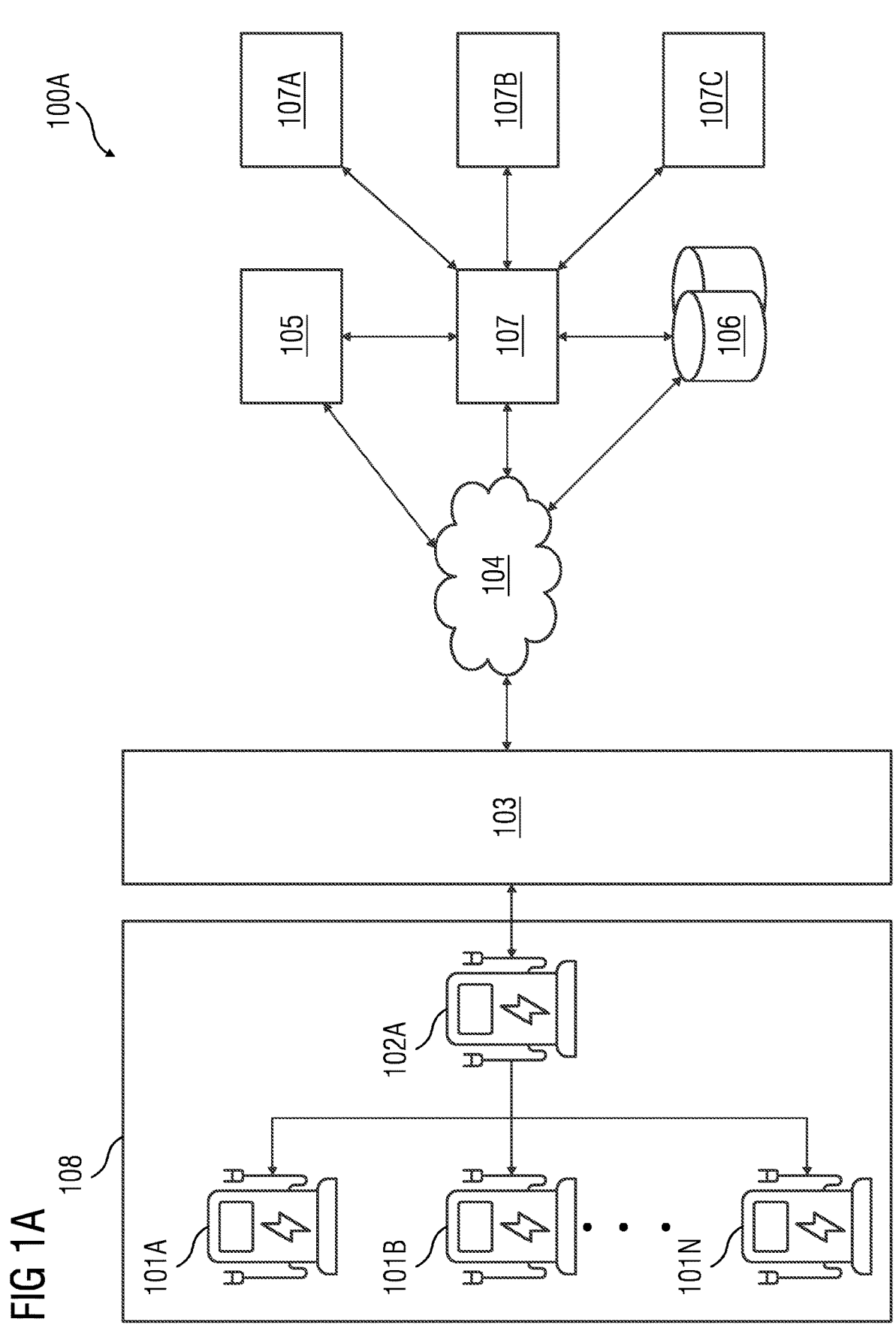

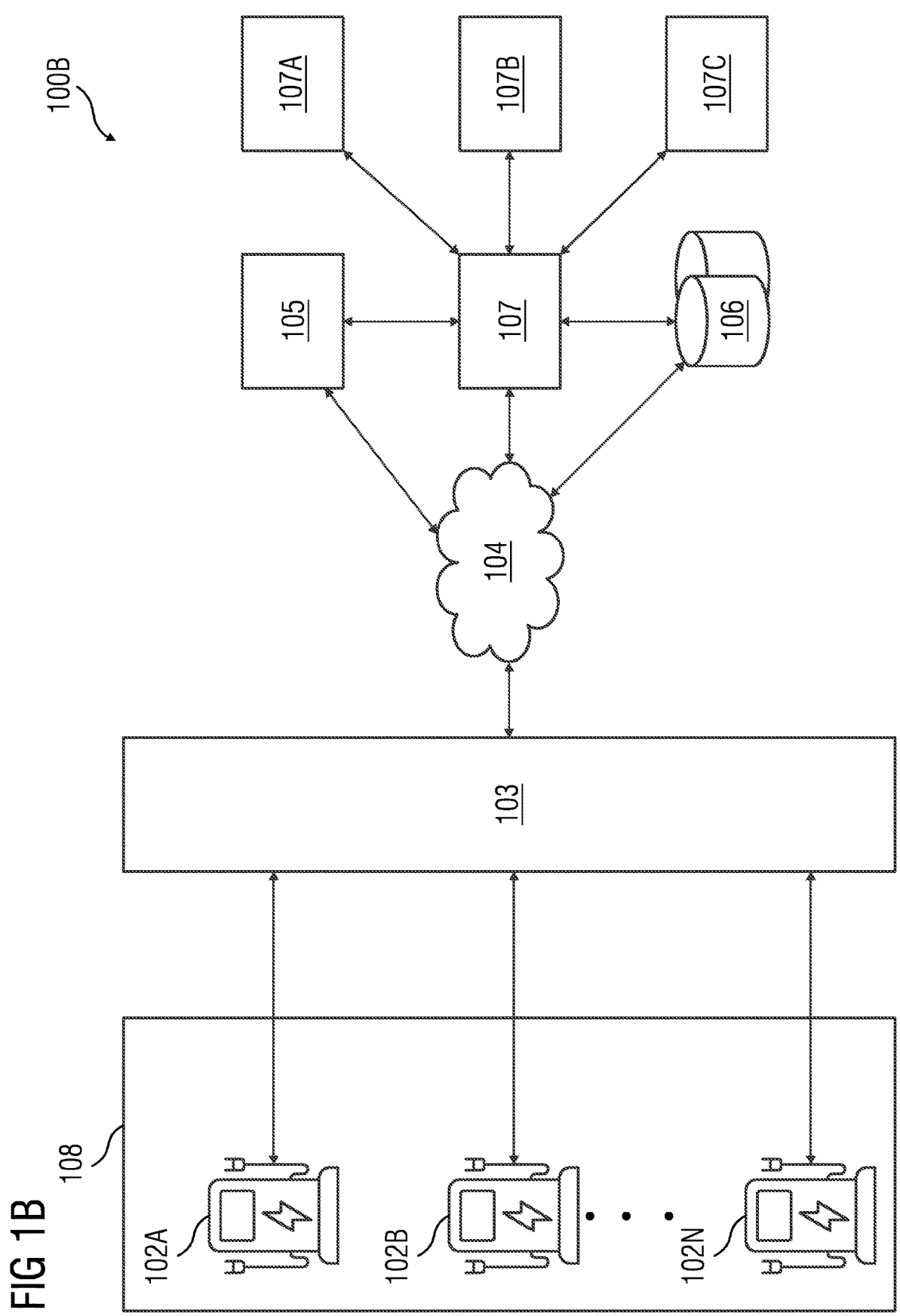

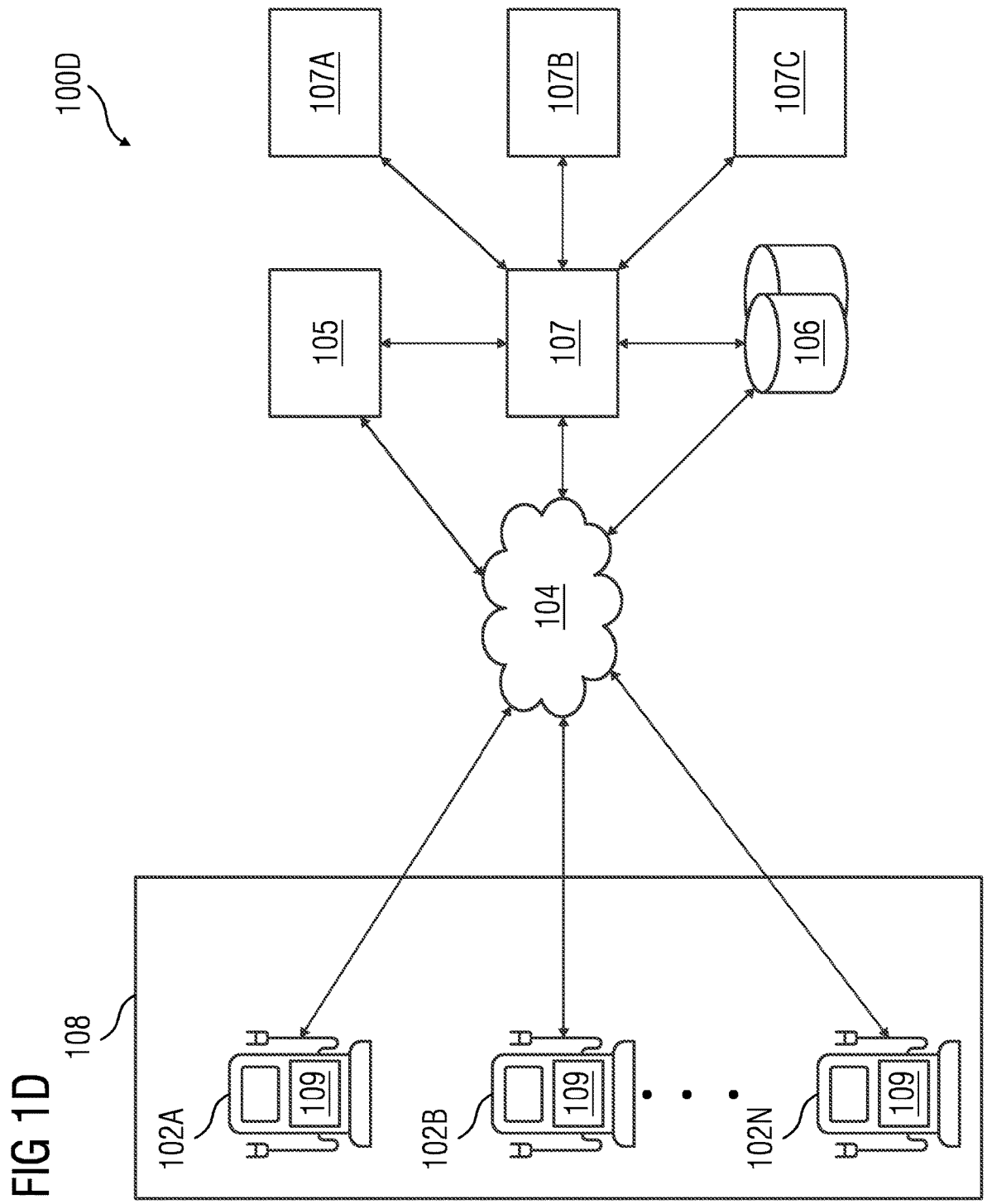

AUTOMATIC, SECURE AND BULK ONBOARDING OF DEVICES

CROSS-REFERENCE TO RELATED APPLICATIONS

This application claims priority to EP Application No. 22170888.6, having a filing date of Apr. 29, 2022, the entire contents of which are hereby incorporated by reference.

FIELD OF TECHNOLOGY

The following relates to a system and a method for onboarding assets. More particularly, the following relates to a system and a method for automatic, secure and bulk onboarding of electric vehicle (EV) charger devices onto charging management systems.

BACKGROUND

With an increase in the environmental awareness growing day by day and several governments across the globe investing in clean energy initiatives, electric vehicles are becoming more and more popular across various fields such as the electric buses and electric taxis for mass transportation, the electric sanitation vehicles for maintaining public health and safety, personal electric vehicles, etc. With such a rapid boom in the number of electric vehicles there is an increasing demand in installation of electric vehicle charging stations all over the world.

Charging parks are typically equipped with plurality of charging stations, that is, charging devices of one or more kinds including AC chargers, DC fast chargers, contact chargers, non-contact or inductive chargers, etc. Secure integration of these chargers onto charging management systems is equally important so that the chargers deployed in these charging parks can be configured, monitored, and diagnosed. More particularly, integration of chargers on cloud-based charging management systems facilitates remote charger management in bulk numbers.

Some examples of charging management systems (CMSs) include a depot management system deployed at a charge point operator location that manages and optimizes daily operation of electric vehicles (EVs) plying to and from the depot; a device management system for configuring, commissioning and diagnosing health of the EV chargers continuously; and/or a customer relationship management (CRM) system managing information and billing associated with commercial/residential service care packages.

However, as mentioned above, the existing charging parks may have a significant number of legacy chargers also known as brownfield chargers already deployed on the field without any communication capability, that is, any connection to the charging management systems (CMSs). Typically, to onboard chargers, and especially the brownfield chargers, onto aforementioned cloud-based systems, a commissioning engineer has to travel to the site to configure and onboard each charger manually and independently to the CMSs.

Moreover, in future there is a possibility of applications such as mobile or web apps associated with the EV charger management growing, owing to various business models being introduced in the field. Thus, an EV charger either brownfield or greenfield would be required to support onboarding onto several systems automatically and in a secure manner so as to provide basic information about itself so that an application associated with management of the EV charger can connect, monitor, and control the charger remotely and simultaneously along with other chargers.

The conventional device onboarding systems and methods are largely known to support manual registration and onboarding where a charge point operator or an owner of a charging station or a charging park registers the chargers onto the CMSs. Some other systems and methods known in the art offer techniques of modeling chargers and/or charging stations in charging parks via injecting a private key or a unique device secret during manufacturing of the chargers. However, the prior art fails to disclose a system and a method that onboards not only new or greenfield chargers but also legacy or brownfield chargers onto the CMSs securely, automatically, and in bulk.

SUMMARY

Accordingly, an aspect relates to provide a system, an apparatus, and a method for onboarding of devices such as chargers onto a cloud-based system such as a charging management system, which ensure secure, automatic and bulk onboarding of the new as well as legacy devices, that is, chargers at a charging park.

As used herein, "onboarding" refers to secure, automatic and bulk admission of a device onto a network such as a wireless network, wherein onboarding may include admission/integration and authentication of a device prior to joining the wireless network. Also used herein, "device" refers to both IoT (Internet of Things) devices capable of directly communicating with a cloud-based network/system and non-IoT devices capable not directly communicating with a cloud-based network/system. Also used herein, "cloud-based system" refers to any system that resides in a cloud and manages the devices and/or activities associated with the devices.

According to one embodiment, the aforementioned device includes a charger capable of delivering charge to a vehicle. It may be appreciated that the term "vehicle" used herein refers to any automobile that has at least a partial electric drive and therefore, requires to be charged. The terms vehicle and electric vehicle (EV) are used interchangeably throughout the present disclosure. According to this embodiment, the cloud-based system is a charging management system (CMS), a customer relationship management system (CRMS), a charge point operator system (CPOS), and/or a device management system (DMS).

The method disclosed herein for bulk onboarding of devices, such as a charger delivering charge to a vehicle, onto a cloud-based system obtains, onboarding parameters associated with each of the devices. The onboarding parameters include a serial number, a media access control (MAC) address, a model number, manufacturer data, a public key such as a secure shell (SSH) encryption key, and/or a certificate imprinted into the devices during manufacturing of the devices.

The devices include at least one parent device capable of communicating with the cloud-based system, over a communication network. According to an embodiment, the devices include child device(s) capable of communicating with the cloud-based system when connected to the parent device. For example, each parent device may have several child devices connected thereto. Advantageously, the child device(s) are capable of communicating with the parent device for example, via a local area network (LAN). The parent device is, for example, a greenfield device. The child device(s) are, for example, brownfield devices. Advantageously, the method obtains the onboarding parameters from the parent device, associated with the parent device and/or the child device(s) connected thereto, if any.

The method dynamically obtains device verification data based on the onboarding parameters associated with the devices. The device verification data includes at least a certificate associated with each of the devices. The method obtains the certificate associated with the parent device and the child device(s) connected thereto, if any, from a device certification system.

The method validates the onboarding parameters based on the device verification data.

According to an embodiment, the method compares the certificate from the device verification data with the certificate from the onboarding parameters and validates the devices, that is, the authenticity of the devices, when the comparison generates a match therebetween. Advantageously, the method performs this automatically so as to have a manual intervention free authentication of the device(s) prior to onboarding thereby, avoiding erroneous and cumbersome authentication procedure.

According to another embodiment, the method transfers the certificate from the onboarding parameters to the device certification system. The device certification system validates the certificate based on the certificate that is available with the device certification system. According to this embodiment, the device verification data obtained from the device certification system comprises whether or not the validation of the certificate was successful, that is, validation passed or validation failed for each of the devices for which the onboarding parameters were obtained.

The method establishes a connection between the parent device and the cloud-based system over a communication network for onboarding the devices, that is, the parent device and the child device(s) connected thereto if any, upon validation of the onboarding parameters.

According to an embodiment, the method obtains device subscription data associated with the devices from a device database. The device subscription data includes, for example, data associated with the device owner, his/her subscription, a capacity of the device, etc. According to this embodiment, the method, based on the device subscription data, automatically selects the cloud-based system for onboarding the devices. For example, the method selects the CMS, the CPOS, the CRMS, the DMS, etc., for establishing connection with the device(s) according to the device subscription data. Advantageously, the method enables multiple cloud-based systems to communicate with the devices. Advantageously, the method, based on the device subscription data, that is, the device owner data, establishes connection between the device(s) and the cloud-based system(s). For example, the method considers ownership of the device(s) before establishing the aforementioned connection thereby, ensuring that the onboarding of the device(s) onto the cloud-based system(s) is being performed with consent of the device owner and therefore, is in line with various data protection laws such as general data protection regulation (GDPR) followed across Europe.

According to another embodiment, the method post establishing connection between the device(s) and the cloud-based system for onboarding of the devices, selectively configures features of the devices during the onboarding based on the device subscription data. According to this embodiment, the method enables the cloud-based system with which the connection is established to configure those features of the device(s) for which the device owner has subscribed to, based on the device subscription data. This enables accurate, automatic, and speedy configuration of the device(s).

Also disclosed herein is a computer program product (non-transitory computer readable storage medium having instructions, which when executed by a processor, perform actions) for onboarding devices onto a cloud-based system. The computer program product comprises a non-transitory computer readable storage medium that stores computer program codes comprising instructions executable by at least one processor for onboarding the devices onto the cloud-based system, as disclosed in aforementioned description.

Also disclosed herein, is the device onboarding system for bulk onboarding of devices onto a cloud-based system. The device onboarding system comprises a non-transitory computer readable storage medium storing computer program instructions defined by the device onboarding system, at least one processor communicatively coupled to the non-transitory computer readable storage medium and executing the computer program instructions for bulk onboarding of the devices onto the cloud-based system. According to an embodiment, the device onboarding system may include one or more module(s) defining the computer program instructions.

The device onboarding system disclosed herein is in an operable communication with the devices, that is, the parent device for example, over a communication network.

According to an embodiment, where the devices are EV chargers, the device onboarding system is in communication with a charging park having one or more chargers deployed therein. According to this embodiment, the device onboarding system is in direct communication with the parent device(s), that is parent chargers. According to this embodiment, the device onboarding system is indirect communication with the child device(s) via the parent device(s), that is, the child charger(s) connected to the parent charger(s).

The device onboarding system is in an operable communication with the cloud-based systems, for example, over the communication network.

According to one embodiment, the device onboarding system is configurable as a web-based platform, for example, a website hosted on a server or a network of servers, for onboarding devices onto the cloud-based system. According to this embodiment, a user accessing the device onboarding system can initiate via a single click automatic, secure and bulk onboarding of devices.

According to another embodiment, the device onboarding system is implemented in the cloud computing environment as a cloud computing-based platform implemented as a service for onboarding the devices onto the cloud-based system.

According to yet another embodiment, the device onboarding system is configured as an edge-based offering that is installable at the charging station for onboarding the devices onto the cloud-based system.

The device onboarding system obtains onboarding parameters associated with each of the devices from the parent device, dynamically obtains device verification data including at least a certificate associated with each of the devices based on the onboarding parameters associated with the devices, from a device certification system, validates the onboarding parameters based on the device verification data by comparing the certificate from the device verification data with the certificate from the onboarding parameters, validates the devices, when the comparison generates a match therebetween, and establishes a connection between the parent device and the cloud-based system over a communication network for onboarding the devices, that is, the parent device and the child device(s) connected thereto if any, upon validation of the onboarding parameters.

According to an embodiment, the device onboarding system obtains device subscription data associated with the devices from a device database. The device subscription data includes, for example, data associated with the device owner, his/her subscription, a capacity of the device, etc. According to this embodiment, the device onboarding system, based on the device subscription data, automatically selects the cloud-based system for onboarding the devices. Advantageously, the device onboarding system enables multiple cloud-based systems to communicate with the devices.

According to another embodiment, the device onboarding system post establishing connection between the device(s) and the cloud-based system for onboarding of the devices, selectively configures features of the devices during the onboarding based on the device subscription data. According to this embodiment, the device onboarding system enables the cloud-based system with which the connection is established to configure those features of the device(s) for which the device owner has subscribed to, based on the device subscription data. This enables accurate, automatic, and speedy configuration of the device(s).

Also disclosed herein is a parent charger. As used herein, the term "parent" refers to a charger that is capable of communicating with a cloud-based system over a communication network. The parent charger is capable of delivering charge to a vehicle. The parent charger has a control unit.

The control unit obtains onboarding parameters associated with the parent charger and/or a child charger if connected any thereto. The child charger is capable of communicating with the cloud-based system when connected to the parent charger. The onboarding parameters comprise at least a first certificate imprinted into the parent charger and the child charger during manufacturing.

The control unit dynamically obtains device verification data based on the onboarding parameters.

According to an embodiment, the device verification data includes at least a second certificate associated with the parent charger and the child charger connected thereto, if any. According to this embodiment, the control unit obtains the second certificate from a device certification system. According to this embodiment, the control unit validates the onboarding parameters based on the device verification data by comparing the second certificate from the device verification data with the first certificate from the onboarding parameters and thus, validates the parent charger and the child charger(s) connected thereto, if any, when the comparison generates a match therebetween.

According to another embodiment, the control unit transfers the first certificate from the onboarding parameters to the device certification system. The device certification system validates the first certificate based on a second certificate that is available with the device certification system. According to this embodiment, the device verification obtained from the device certification system comprises whether or not the validation of the certificate was successful, that is, whether or not the parent charger and the child charger(s) connected thereto, if any, are authentic.

The control unit establishes a connection between the parent charger and the cloud-based system over a communication network for onboarding of the parent charger and the child charger(s) connected thereto if any, upon validation of the onboarding parameters.

According to an embodiment, the control unit obtains device subscription data associated with the parent charger and the child charger(s) connected thereto if any, from a device database, and selects the cloud-based system for onboarding the parent charger and the child charger(s) based on the device subscription data.

According to another embodiment, the control unit, during the onboarding, selectively configures features of the parent charger and the child charger(s) connected thereto if any, based on the device subscription data.

Advantageously, the aforementioned method, device onboarding system, computer program product and the parent charger, simultaneously onboard multiple devices such as the parent charger and the child charger(s) connected thereto, if any there-along, thus enabling bulk onboarding of the device(s) both greenfield as well as brownfield onto the cloud-based system(s) in a secure and automatic manner.

The above mentioned and other features of embodiments of the invention will now be addressed with reference to the accompanying drawings of embodiments of the present invention. The illustrated embodiments are intended to illustrate, but not limit embodiments of the invention.

BRIEF DESCRIPTION

Some of the embodiments will be described in detail, with reference to the following figures, wherein like designations denote like members, wherein:

FIG. 1A illustrates a system with a device onboarding system in communication with a plurality of devices for onboarding the devices onto a cloud-based system;

FIG. 1B illustrates a system with a device onboarding system, in communication with a plurality of devices, for onboarding the devices onto a cloud-based system, according to various embodiments of the present disclosure;

FIG. 1D illustrates a system with a parent charger configured with a control unit for onboarding onto a cloud-based system, according to various embodiments of the present disclosure;

Figure 1C:
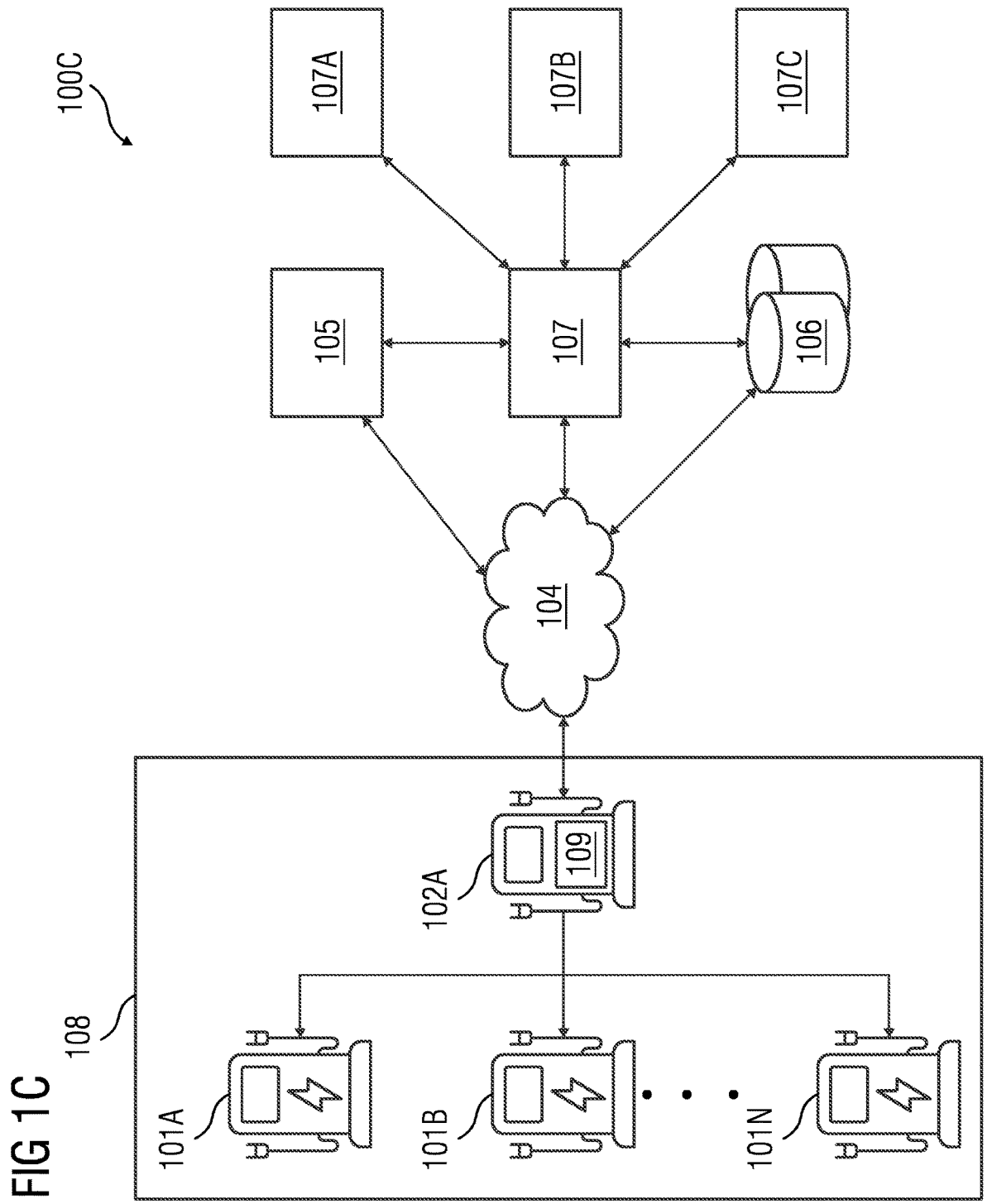
FIG. 1C illustrates a system with a parent charger configured with a control unit for onboarding onto a cloud-based system according to various embodiments of the present disclosure.
Figure 2:
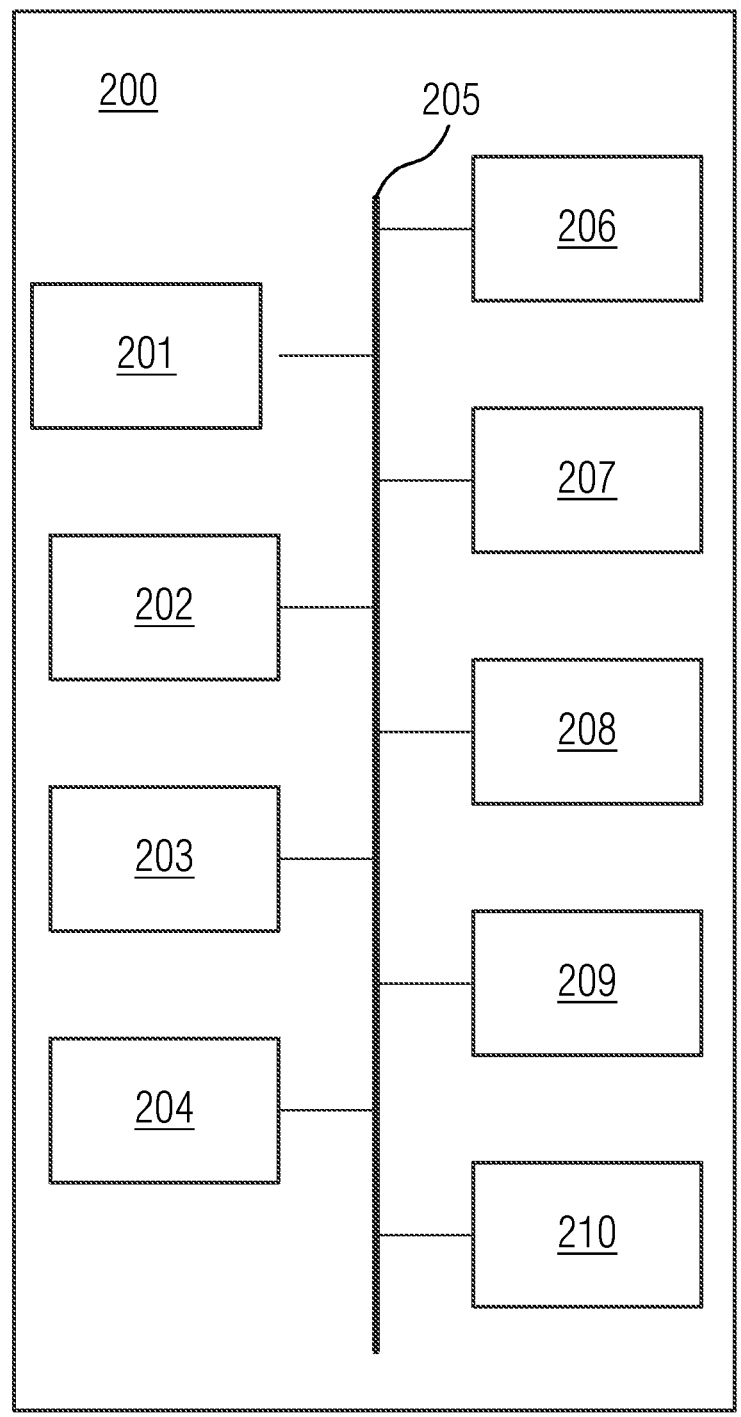
Figure 3:
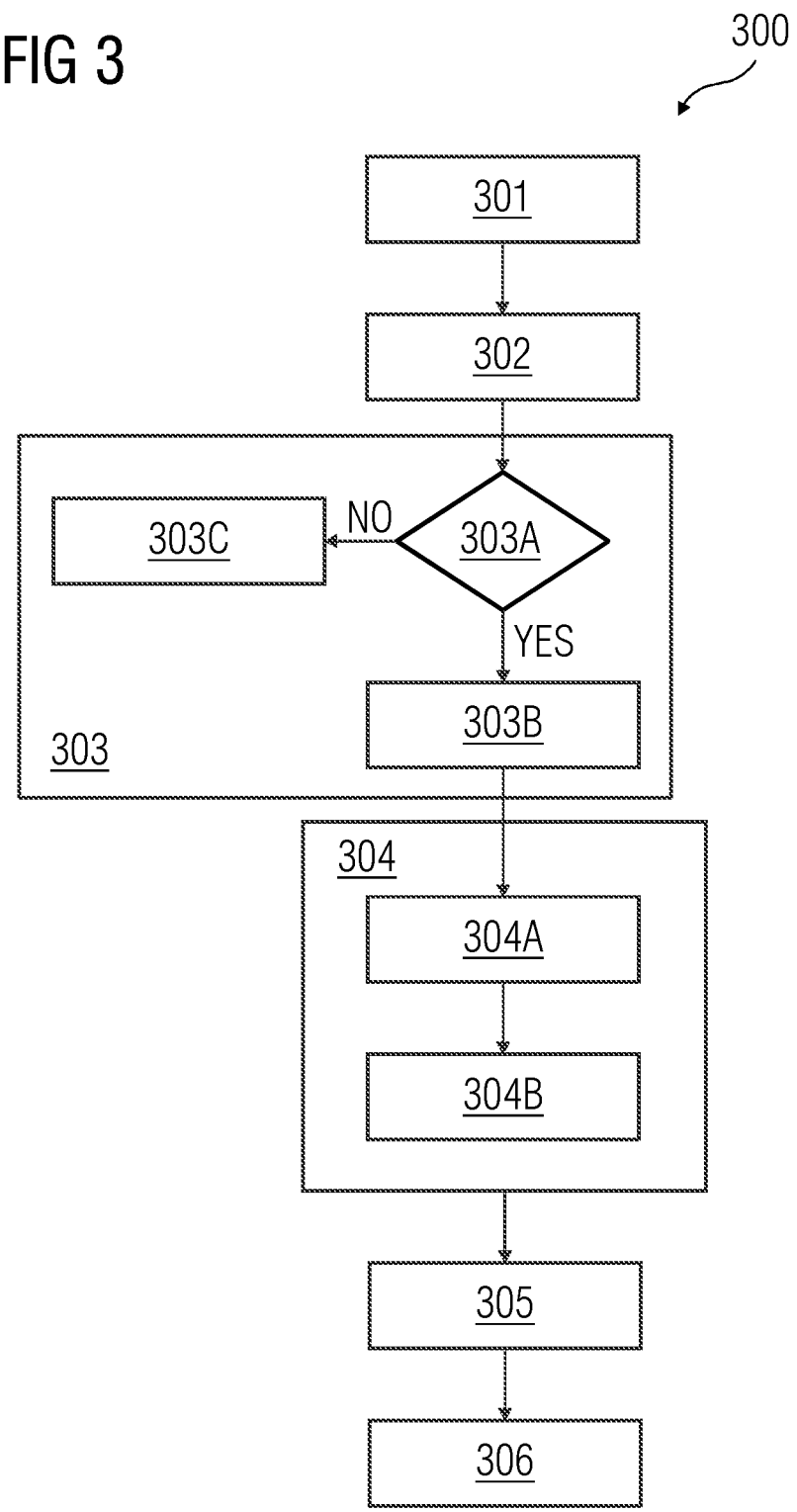

FIG. 2 is a block diagram illustrating an architecture of a computer system employed by the device onboarding system shown in FIGS. 1A-1B, for onboarding devices onto a cloud-based system, according to an embodiment of the present disclosure; and FIG. 3 illustrates a process flowchart of a method for onboarding devices onto a cloud-based system, according to an embodiment of the present disclosure.

DETAILED DESCRIPTION

Various embodiments are described with reference to the drawings, wherein like reference numerals are used to refer like elements throughout. In the following description, for the purpose of explanation, numerous specific details are set forth in order to provide thorough understanding of one or more embodiments. It may be evident that such embodiments may be practiced without these specific details.

FIGS. 1A-1B illustrate a system 100A, 100B, comprising a device onboarding system 103, in communication with a plurality of devices 101A-101N, 102A-102N for onboarding the devices 101A-101N, 102A-102N onto a cloud-based system 107, according to various embodiments of the present disclosure. As shown in the FIGS. 1A-1B, the devices 101A-101N, 102A-102N are EV chargers deployed in a charging park 108. The device onboarding system 103 is in communication with the chargers. This communication can be over a wired communication network or a wireless communication network, for example the communication network 104.

The devices 101A-101N, 102A-102N, that is, the chargers include parent chargers 102A-102N and child chargers 101A-101N connected to the parent charger(s) 102A-102N. The parent charger(s) 102A-102N are in communication with the device onboarding system 103. The device onboarding system 103 is also in communication with the cloud-based system 107 via the communication network 104. The communication network 104 is, for example, a wired network, a wireless network, or a network formed from any combination thereof.

The device onboarding system 103 disclosed herein is installable on and accessible by a user device, for example, a personal computing device, a workstation, a client device, a network enabled computing device, any other suitable computing equipment, and combinations of multiple pieces of computing equipment being used by a user (not shown). The device onboarding system 103 is configurable as a web-based platform, for example, a website hosted on a server or a network of servers, or, is implemented in the cloud computing environment as a cloud computing-based platform implemented as a service for onboarding the devices 101A-101N, 102A-102N onto the cloud-based system 107. The device onboarding system 103 may have one or more users for example, a charge point operator managing the charging park 108.

The device onboarding system 103 is also in communication with a device certification system 105 and a device database 106, via the communication network 104. The device certification system 105 stores therein a certificate associated with the devices 101A-101N, 102A-102N. The device database 106 stores therein device subscription data associated with the devices 101A-101N, 102A-102N.

The cloud-based system 107 is, for example, a charging management system (CMS) 107 which in turn is connected to one or more other cloud-based systems such as a charge point operator system (CPOS) 107A, a customer relationship management system (CRMS) 107B, and a device management system (DMS) 107C. In another example, the device onboarding system 103 is in direct communication with the aforementioned cloud-based systems 107A-107C.

As shown in FIG. 1A, the device onboarding system 103 onboards the parent charger 102A and the child chargers 101A-101N connected to the parent charger 102A onto the cloud-based system 107 in an automatic, secure and bulk manner.

As shown in FIG. 1B, the device onboarding system 103 onboards the parent chargers 102A-102N onto the cloud-based system 107 in an automatic, secure and bulk manner.

The device onboarding system 103 obtains onboarding parameters associated with each of the devices 101A-101N, 102A-102N from the parent device, that is, the parent charger(s) 102A-102N.

The device onboarding system 103 comprises a non-transitory computer readable storage medium storing computer program instructions defined by the device onboarding system 103, at least one processor communicatively coupled to the non-transitory computer readable storage medium and executing the computer program instructions for bulk onboarding of the devices 101A-101N, 102A-102N onto the cloud-based system 107. The device onboarding system 103 may include one or more module(s) (not shown) defining the computer program instructions.

The device onboarding system 103 dynamically obtains device verification data including at least a certificate associated with each of the devices 101A-101N, 102A-102N based on the onboarding parameters associated with the devices 101A-101N, 102A-102N, from the device certification system 105.

The device onboarding system 103 validates the onboarding parameters based on the device verification data by comparing the certificate from the device verification data, for example, a second certificate, with the certificate from the onboarding parameters, for example, a first certificate, received from the parent charger(s) 102A-102N including the certificates associated with the devices 101A-101N, 102A-102N.

The device onboarding system 103 validates the devices 101A-101N, 102A-102N, when the comparison generates a match therebetween, and establishes a connection between the parent device, that is, the parent charger(s) 102A-102N, and the cloud-based system 107 over the communication network 104 for onboarding the devices 101A-101N, 102A-102N, that is, the parent charger(s) 102A-102N and the child chargers 101A-101N connected thereto if any, upon validation of the onboarding parameters.

The device onboarding system 103 obtains device subscription data associated with the devices 101A-101N, 102A-102N from the device database 106. The device subscription data includes, for example, data associated with the device owner, his/her subscription, a capacity of the device such as the charger capacity, etc. The device onboarding system 103, based on the device subscription data, automatically selects the cloud-based system(s) 107, 107A, 107B, and/or 107C, etc., for onboarding the devices 101A-101N, 102A-102N. The device onboarding system 103, thus enables multiple cloud-based systems 107, 107A-107C to communicate with the devices 101A-101N, 102A-102N.

The device onboarding system 103 post establishing connection between the device(s) 101A-101N, 102A-102N and the cloud-based system 107 for onboarding of the devices 101A-101N, 102A-102N, selectively configures features of the devices 101A-101N, 102A-102N during the onboarding based on the device subscription data. The device onboarding system 103 enables the cloud-based system 107 with which the connection is established to configure those features of the device(s) 101A-101N, 102A-102N for which the device owner has subscribed to, based on the device subscription data. This enables accurate, automatic, and speedy configuration of the device(s).

FIGS. 1C-1D illustrate a system 100C, 100D, comprising a parent charger 102A-102N configured with a control unit 109 for onboarding onto a cloud-based system 107, according to various embodiments of the present disclosure. The control unit 109 onboards the parent charger(s) 102A-102N and child chargers 101A-101N connected to the parent charger(s) 102A-102N, if any onto the cloud-based system 107. The parent charger(s) 102A-102N are capable of delivering charge to a vehicle (not shown).

As shown in FIG. 1C, the parent charger 102A having the control unit 109, is connected to multiple child chargers 101A-101N. The parent charger 102A is capable of communicating with the could-based system 107 via the communication network 104. The control unit 109 onboards the parent charger 102A and the child chargers 101A-10N onto the cloud-based system 107 in an automatic, secure and bulk manner.

FIG. 1D shows multiple parent chargers 102A-102N each having a control unit 109 therewithin and capable of communicating with the could-based system 107 via the communication network 104. The control unit 109 in each of the parent chargers 102A-102N onboards the parent chargers 102A-102N onto the cloud-based system 107 in an automatic, secure and bulk manner.

The control unit 109 obtains onboarding parameters associated with the parent charger(s) 102A-102N and/or child charger(s) 101A-101N connected to the parent charger(s) 102A-102N, if any. The child charger(s) 101A-101N are capable of communicating with the cloud-based system 107 when connected to the parent charger(s) 102A-102N. The onboarding parameters include at least a first certificate imprinted into the parent charger(s) 102A-102N and the child charger(s) 101A-101N, during manufacturing of the chargers 101A-101N, 102A-102N.

The control unit 109 dynamically obtains device verification data based on the onboarding parameters. The device verification data includes at least a second certificate associated with the parent charger(s) 102A-102N and the child charger(s) 101A-101N connected thereto, if any. The control unit 109 obtains the second certificate from the device certification system 105.

The control unit 109 validates the onboarding parameters based on the device verification data. The control unit 109 compares the second certificate from the device verification data with the first certificate from the onboarding parameters and validates the parent charger(s) 102A-102N and the child charger(s) 101A-101N connected thereto, if any, when the comparison generates a match therebetween.

The control unit 109 establishes a connection between the parent charger(s) 102A-102N and the cloud-based system 107 over the communication network 104 for onboarding of the parent charger(s) 102A-102N and the child charger(s) 101A-101N connected thereto, if any, upon validation of the onboarding parameters.

The control unit 109 obtains device subscription data associated with the parent charger(s) 102A-102N and the child charger(s) 101A-101N connected thereto if any, from the device database 106, and selects the cloud-based system(s) 107, 107A, 107B, and/or 107C, for onboarding the parent charger(s) 102A-102N and the child charger(s) 101A-101N based on the device subscription data.

The control unit 109, during the onboarding, selectively configures features of the parent charger(s) 102A-102N and the child charger(s) 101A-101N connected thereto if any, based on the device subscription data.

FIG. 2 is a block diagram illustrating an architecture of a computer system 200 employed by the device onboarding system 103 shown in FIGS. 1A-1B, for onboarding devices 101A-101N, 102A-102N onto a cloud-based system 107, according to an embodiment of the present disclosure.

The device onboarding system 103 employs the architecture of the computer system 200, according to an embodiment of the present disclosure. The computer system 200 is programmable using a high-level computer programming language. The computer system 200 may be implemented using programmed and purposeful hardware. The computer system 200 comprises a processor 201, a non-transitory computer readable storage medium such as a memory unit 202 for storing programs and data, an input/output (I/O) controller 203, a network interface 204, a data bus 205, a display unit 206, input devices 207, a fixed media drive 208 such as a hard drive, a removable media drive 209 for receiving removable media, output devices 210, etc.

The processor 201 refers to any one of microprocessors, central processing unit (CPU) devices, finite state machines, microcontrollers, digital signal processors, an application specific integrated circuit (ASIC), a field-programmable gate array (FPGA), etc., or any combination thereof, capable of executing computer programs or a series of commands, instructions, or state transitions. The processor 201 may also be implemented as a processor set comprising, for example, a general-purpose microprocessor and a math or graphics co-processor. The device onboarding system 103 disclosed herein is not limited to a computer system 200 employing a processor 201. The computer system 200 may also employ a controller or a microcontroller. The processor 201 executes the computer program instructions defined by the device onboarding system 103, for example, modules of the device onboarding system 103.

The memory unit 202 is used for storing programs, applications, and data. For example, the computer program instructions defined by the device onboarding system 103 are stored in the memory unit 202 of the computer system 200. The memory unit 202 is, for example, a random-access memory (RAM) or another type of dynamic storage device that stores information and instructions for execution by the processor 201. The memory unit 202 also stores temporary variables and other intermediate information used during execution of the instructions by the processor 201. The computer system 200 further comprises a read only memory (ROM) or another type of static storage device that stores static information and instructions for the processor 201. The I/O controller 203 controls input actions and output actions performed by the device onboarding system 103.

The network interface 204 enables connection of the computer system 200 to the communication network 104. For example, the device onboarding system 103 connects to the communication network 104 via the network interface 204. In an embodiment, the network interface 204 is provided as an interface card also referred to as a line card. The network interface 204 comprises, for example, interfaces using serial protocols, interfaces using parallel protocols, and Ethernet communication interfaces, interfaces based on wireless communications technology such as satellite technology, radio frequency (RF) technology, near field communication, etc. The data bus 205, for example, may permit communications between the modules of device onboarding system 103.

The display unit 206, via the graphical user interface (GUI) (not shown) of the device onboarding system 103, displays information such as the certificates, the device subscription data, etc. The display unit 206, via the GUI, also displays information such as user interface elements including text fields, buttons, windows, etc., for allowing a user to provide his/her inputs such as trigger the onboarding of the devices 101A-101N, 102A-102N via a click of a button, etc. The display unit 206 comprises, for example, a liquid crystal display, a plasma display, an organic light emitting diode (OLED) based display, etc. The input devices 207 are used for inputting data into the computer system 200. The input devices 207 are, for example, a keyboard such as an alphanumeric keyboard, a touch sensitive display device, and/or any device capable of sensing a tactile input.

Computer applications and programs are used for operating the computer system 200. The programs are loaded onto the fixed media drive 208 and into the memory unit 202 of the computer system 200 via the removable media drive 209. In an embodiment, the computer applications and programs may be loaded directly via the communication network 102. Computer applications and programs are executed by double clicking a related icon displayed on the display unit 206 using one of the input devices 207. The output devices 210 output the results of operations performed by the device onboarding system 103. For example, the device onboarding system 103 provides graphical representation of the devices 101A-101N, 102A-102N ready to be onboarded, that is, in communication with the cloud-based system 107, using the output devices 210.

The processor 201 executes an operating system. The computer system 200 employs the operating system for performing multiple tasks. The operating system is responsible for management and coordination of activities and sharing of resources of the computer system 200. The operating system further manages security of the computer system 200, peripheral devices connected to the computer system 200, and network connections. The operating system employed on the computer system 200 recognizes, for example, inputs provided by the users using one of the input devices 207, the output display, files, and directories stored locally on the fixed media drive 208. The operating system on the computer system 200 executes different programs using the processor 201. The processor 201 and the operating system together define a computer platform for which application programs in high level programming languages are written.

The processor 201 of the computer system 200 employed by the device onboarding system 103 retrieves instructions defined by the device onboarding system 103 for onboarding the devices 101A-101N, 102A-102N as disclosed in the detailed description of FIGS. 1A-1B. The processor 201 retrieves instructions from the memory unit 202. A program counter determines the location of the instructions in the memory unit 202. The program counter stores a number that identifies the current position in the program of each of instructions defined by the device onboarding system 103. The instructions fetched by the processor 201 from the memory unit 202 after being processed are decoded. The instructions are stored in an instruction register in the processor 201. After processing and decoding, the processor 201 executes the instructions, thereby performing one or more processes defined by those instructions.

At the time of execution, the instructions stored in the instruction register are examined to determine the operations to be performed. The processor 201 then performs the specified operations. The operations comprise arithmetic operations and logic operations. The operating system performs multiple routines for performing several tasks required to assign the input devices 207, the output devices 210, and memory for execution of the computer program instructions defined by the device onboarding system 103. The tasks performed by the operating system comprise, for example, assigning memory to the computer program instructions, and to data used by the device onboarding system 103, moving data between the memory unit 202 and disk units, and handling input/output operations. The operating system performs the tasks on request by the operations and after performing the tasks, the operating system transfers the execution control back to the processor 201. The processor 201 continues the execution to obtain one or more outputs. The outputs of the execution of the computer program instructions are displayed to the user on the GUI.

For purposes of illustration, the detailed description refers to the device onboarding system 103 being run locally on the computer system 200, however the scope of embodiments of the present invention is not limited to the device onboarding system 103 being run locally on the computer system 200 via the operating system and the processor 201, but may be extended to run remotely over the communication network 102 by employing a web browser and a remote server, a mobile phone, or other electronic devices. One or more portions of the computer system 200 may be distributed across one or more computer systems (not shown) coupled to the communication network 104.

Disclosed herein is also a computer program product comprising a non-transitory computer readable storage medium that stores computer program codes comprising instructions executable by at least one processor 201 for onboarding the devices 101A-101N, 102A-102N onto the cloud-based system 107, as disclosed in aforementioned description.

The computer program product comprises a first computer program code for obtaining, onboarding parameters associated with each of the devices 101A-101N, 102A-102N including at least one parent device 102A-102N capable of communicating with the cloud-based system 107; a second compute program code for dynamically obtaining device verification data based on the onboarding parameters associated with the devices 101A-101N, 102A-102N, the device verification data comprises at least a certificate associated with each of the devices 101A-101N, 102A-102N; a third computer program code for validating the onboarding parameters based on the device verification data; and fourth computer program code for establishing a connection between the at least one parent device 102A-102N and the cloud-based system 107 over the communication network 104 for onboarding the devices 101A-101N, 102A-102N, upon validation of the onboarding parameters.

The second computer program code comprises a fifth computer program code for obtaining the certificate associated with the at least one parent device 102A-102N and/or child devices 101A-101N connected thereto, if any, from a device certification system 105.

The third computer program code comprises a sixth computer program code for comparing the certificate from the device verification data with a certificate from the onboarding parameters; and a seventh computer program code for validating the devices 101A-101N, 102A-102N when the comparison generates a match therebetween.

The fourth computer program code comprises an eighth computer program code for obtaining device subscription data associated with the devices 101A-101N, 102A-102N from the device database 106; and a ninth computer program code for selecting the cloud-based system 107 for onboarding the devices 101A-101N, 102A-102N based on the device subscription data.

The computer program product also comprises a tenth computer program code for selectively configuring features of the devices 101A-101N, 102A-102N during the onboarding based on the device subscription data.

In an embodiment, a single piece of computer program code comprising computer executable instructions, performs one or more steps of the method according to the present disclosure, for bulk onboarding of the devices 101A-101N, 102A-102N onto the cloud-based system 107. The computer program codes comprising computer executable instructions are embodied on the non-transitory computer readable storage medium. The processor 201 of the computer system 200 retrieves these computer executable instructions and executes them. When the computer executable instructions are executed by the processor 201, the computer executable instructions cause the processor 201 to perform the steps of the computer implemented method for bulk onboarding of the devices 101A-101N, 102A-102N onto the cloud-based system 107.

FIG. 3 illustrates a process flowchart 300 of a method for onboarding devices 101A-101N, 102A-102N onto a cloud-based system 107, according to an embodiment of the present disclosure.

The method, at step 301, obtains, onboarding parameters associated with each of the devices 101A-101N, 102A-102N as shown in FIGS. 1A-1D. The onboarding parameters include a serial number, a media access control (MAC) address, a model number, manufacturer data, a public key such as a secure shell (SSH) encryption key, and/or a certificate imprinted into the devices 101A-101N, 102A-102N during manufacturing of the devices 101A-101N, 102A-102N.

The devices 101A-101N, 102A-102N include at least one parent device 102A-102N capable of communicating with the cloud-based system 107, over a communication network 104. The devices 101A-101N, 102A-102N include child device(s) 101A-101N capable of communicating with the cloud-based system 107 when connected to the parent device 102A-102N. For example, each parent device 102A-102N may have several child devices 101A-101N connected thereto. The child device(s) 101A-101N are capable of communicating with the parent device 102A-102N via a local area network (LAN). Thus, the onboarding parameters of the child devices 101A-101N are obtained via the parent device(s) 102A-102N to which the child device 101A-101N are connected. The parent device 102A-102N is a greenfield device. The child device 101A-101N is brownfield device. The method obtains the onboarding parameters from the parent device 102A-102N, associated with the parent device 102A-102N and/or the child device(s) 101A-101N connected thereto, if any.

The method at step 301, simultaneously obtains the onboarding parameters from the parent device(s) 102A-102N.

At step 302, the method dynamically obtains device verification data based on the onboarding parameters associated with the devices 101A-101N, 102A-102N. The device verification data includes at least a certificate associated with each of the devices 101A-101N, 102A-102N. The method obtains the certificate associated with the parent device 102A-102N and the child device(s) 101A-101N connected thereto, if any, from a device certification system 105. The method obtains the device verification data dynamically, in that, upon obtaining the onboarding parameters, the device verification data is automatically obtained without any manual intervention. For example, at step 302, the method extracts the serial number of each of the devices 101A-101N, 102A-102N from the onboarding parameters and based on the serial number, the method obtains the certificates for corresponding devices 101A-101N, 102A-102N from the device verification system 105.

At step 303, the method validates the onboarding parameters based on the device verification data. At step 303A, the method compares the certificate from the device verification data with the certificate from the onboarding parameters. At step 303B, the method validates the devices 101A-101N, 102A-102N, that is, the authenticity of the devices 101A-101N, 102A-102N, when the comparison generates a match therebetween. Else, when there is a mismatch, at step 303C, the method generates an error notification signifying authenticity of the devices 101A-101N, 102A-102N not confirmed thus, aborting the automatic onboarding of the devices 101A-101N, 102A-102N. Advantageously, the method performs this automatically so as to have a manual intervention free authentication of the device(s) 101A-101N, 102A-102N prior to onboarding thereby, avoiding erroneous and cumbersome authentication procedure.

At step 304, the method establishes a connection between the parent device 102A-102N and the cloud-based system 107 over the communication network 104 for onboarding the devices 101A-101N, 102A-102N, that is, the parent device 102A-102N and the child device(s) 101A-101N connected thereto if any, upon validation of the onboarding parameters.

The method, at step 304A, obtains device subscription data associated with the devices 101A-101N, 102A-102N from the device database 106. The device subscription data includes, for example, data associated with the device owner, his/her subscription, a capacity of the device 101A-101N, 102A-102N, etc. The method, at step 304B, based on the device subscription data, automatically selects the cloud-based system 107, 107A, 107B, and/or 107C for onboarding the devices 101A-101N, 102A-102N. For example, the method selects the CMS 107, the CPOS 107A, the CRMS 107B, and/or the DMS 107C, etc., for establishing connection with the device(s) 101A-101N, 102A-102N according to the device subscription data. The method thus enables multiple cloud-based systems 107, 107A-107C to communicate with the devices 101A-101N, 102A-102N simultaneously.

At step 305, the method post establishing connection between the device(s) 101A-101N, 102A-102N and the cloud-based system 107, 107A-107C for onboarding of the devices 101A-101N, 102A-102N, selectively configures features of the devices 101A-101N, 102A-102N during the onboarding based on the device subscription data. The method enables the cloud-based system 107, 107A-107C with which the connection is established to configure those features of the device(s) 101A-101N, 102A-102N for which the device owner has subscribed to, based on the device subscription data. This enables accurate, automatic, and speedy configuration of the device(s).

At step 306, the method stores the data such as the onboarding parameters, the device verification data, the device subscription data, the error notifications, etc., into the device database 106 for future reference, required, if any.

Where databases are described such as the device database 106, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries can be different from those disclosed herein. Further, despite any depiction of the databases as tables, other formats including relational databases, object-based models, and/or distributed databases may be used to store and manipulate the data types disclosed herein. Likewise, object methods or behaviors of a database can be used to implement various processes such as those disclosed herein. In addition, the databases may, in a known manner, be stored locally or remotely from a device that accesses data in such a database. In embodiments where there are multiple databases in the system, the databases may be integrated to communicate with each other for enabling simultaneous updates of data linked across the databases, when there are any updates to the data in one of the databases.

The present disclosure can be configured to work in a network environment comprising one or more computers that are in communication with one or more devices via a network. The computers may communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, some examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, some examples of which are disclosed above. While the operating system may differ depending on the type of computer, the operating system will continue to provide the appropriate communications protocols to establish communication links with the network. Any number and type of machines may be in communication with the computers.

The present disclosure is not limited to a particular computer system platform, processor, operating system, or network. One or more aspects of the present disclosure may be distributed among one or more computer systems, for example, servers configured to provide one or more services to one or more client computers, or to perform a complete task in a distributed system. For example, one or more aspects of the present disclosure may be performed on a client-server system that comprises components distributed among one or more server systems that perform multiple functions according to various embodiments. These components comprise, for example, executable, intermediate, or interpreted code, which communicate over a network using a communication protocol. The present disclosure is not limited to be executable on any particular system or group of systems, and is not limited to any particular distributed architecture, network, or communication protocol.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for bulk onboarding of devices onto a cloud-based system, said method comprising:
obtaining, by an onboarding system, onboarding parameters associated with each of the devices, wherein the devices comprise at least one parent device capable of communicating with the cloud-based system via the onboarding system and a communication network,
wherein the onboarding parameters are obtained by the onboarding system from the at least one parent device, wherein the onboarding system is communicatively coupled directly to a charging park that comprises the devices and directly to the cloud-based system via the communication network, wherein each device comprises a charger configured to deliver charge to a vehicle;
dynamically obtaining, by the onboarding system from a device certification system of an external system via the communication network, device verification data based on the onboarding parameters associated with the devices, wherein the device verification data includes at least a certificate associated with each of the devices, and wherein the external system is external to the charging park;
validating, by the onboarding system, the onboarding parameters based on the device verification data; and
establishing, by the onboarding system, a connection between the at least one parent device and the cloud-based system over the communication network for onboarding the devices, upon validation of the onboarding parameters.

2. The method according to claim 1, wherein the devices comprise one or more child devices capable of communicating with the cloud-based system when connected to the at least one parent device.

3. The method according to claim 1, wherein the onboarding parameters comprise one or more of a serial number, a media access control address, a public key, and a certificate imprinted into the devices during manufacturing.

4. The method according to claim 1, wherein dynamically obtaining the device verification data comprises obtaining the certificate associated with the at least one parent device from a device certification system.

5. The method according to claim 1, wherein validating the onboarding parameters comprises:
comparing the certificate from the device verification data with a certificate from the onboarding parameters; and
validating the devices when the comparing generates a match between the certificate from the device verification data and the certificate from the onboarding parameters.

6. The method according to claim 1, wherein said establishing the connection between the at least one parent device and the cloud-based system over the communication network comprises:
obtaining device subscription data associated with the devices from a device database; and
selecting the cloud-based system for onboarding the devices based on the device subscription data.

7. The method according to claim 1, further comprising selectively configuring features of the devices during the onboarding based on the device subscription data.

8. A computer-program product, comprising a computer readable hardware storage device having computer readable program code stored therein, said program code executable by a processor of a computer system to implement a method having machine-readable instructions stored therein, which when executed by one or more processing units, cause the processing units to perform the method according to claim 1.

9. A device onboarding system for bulk onboarding of devices onto a cloud-based system, wherein:
a non-transitory computer readable storage medium storing computer program instructions defined by the device onboarding system;
at least one processor communicatively coupled to the non-transitory computer readable storage medium, wherein the at least one processor is configured to execute the computer program instructions, thereby performing the method according to claim 1.

10. A parent charger capable of communicating with a cloud-based system, the parent charger capable of delivering charge to a vehicle, the parent charger comprising a control unit configured to perform a method for onboarding one or more of the parent charger and a child charger onto the cloud-based system, the child charger connected to the parent charger, said method comprising;
- obtaining, onboarding parameters associated with one or more of the parent charger and the child charger, wherein the child charger is capable of communicating with the cloud-based system when connected to the parent charger, and wherein the onboarding parameters comprise at least a first certificate imprinted into the parent charger and the child charger during manufacturing;
- dynamically obtaining device verification data based on the onboarding parameters, wherein the device verification data comprises at least a second certificate associated with one or more of the parent charger and the child charger,
- validating the onboarding parameters based on the device verification data; and
- establishing a connection between the parent charger and the cloud-based system over a communication network for onboarding one or more of the parent charger and the child charger, upon validation of the onboarding parameters.

11. The parent charger according to claim 10, wherein in dynamically obtaining the device verification data, the control unit is configured to obtain the second certificate from a device certification system.

12. The parent charger according to claim 10, wherein in validating the onboarding parameters, the control unit is configured to:
- compare the second certificate from the device verification data with the first certificate from the onboarding parameters; and
- validate one or more of the parent charger and the child charger when the comparing generates a match between the second certificate from the device verification data and the first certificate from the onboarding parameters.

13. The parent charger according to claim 10, wherein in establishing a connection between the parent charger and the cloud-based system over a communication network, the control unit is configured to:
- obtain device subscription data associated with one or more of the parent charger and the child charger, from a device database; and
- select the cloud-based system for onboarding one or more of the parent charger and the child charger, based on the device subscription data.

14. The parent charger according to claim 10, wherein the control unit, during the onboarding, is configured to selectively configure features of one or more of the parent charger and the child charger, based on the device subscription data.

15. A method for onboarding one or more of a parent charger and a child charger onto a cloud-based system, the child charger connected to the parent charger, the parent charger capable of communicating with the cloud-based system, the parent charger capable delivering charge to a vehicle, the parent charger comprising a control unit configured to perform the method, said method comprising:
- obtaining, onboarding parameters associated with one or more of the parent charger and the child charger, wherein the child charger is capable of communicating with the cloud-based system when connected to the parent charger, and wherein the onboarding parameters comprise at least a first certificate imprinted into the parent charger and the child charger during manufacturing;
- dynamically obtaining device verification data based on the onboarding parameters, wherein the device verification data comprises at least a second certificate associated with one or more of the parent charger and the child charger,
- validating the onboarding parameters based on the device verification data; and
- establishing a connection between the parent charger and the cloud-based system over a communication network for onboarding one or more of the parent charger and the child charger connected thereto, upon validation of the onboarding parameters.

* * * * *